Figure 2:
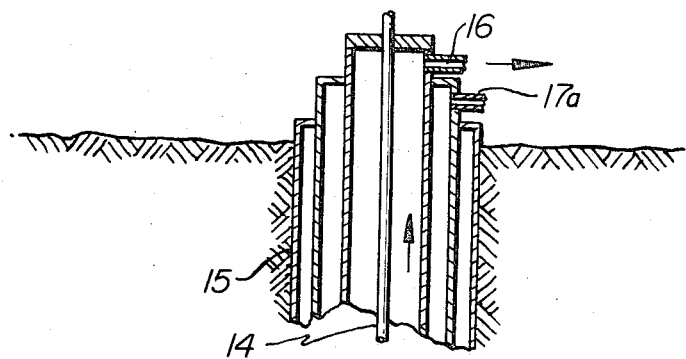

United States Patent
Mosier

[15] 3,676,363

[45] July 11, 1972

[54] PRODUCTION OF WEIGHTED MICROCAPSULAR MATERIALS

[72] Inventor: Benjamin Mosier, 5139 S. Braeswood, Houston, Tex. 77035

[22] Filed: Sept. 4, 1969

[21] Appl. No.: 855,100

Related U.S. Application Data

[63] Continuation of Ser. No. 451,285, April 27, 1965, abandoned, which is a continuation-in-part of Ser. No. 316,763, Oct. 16, 1963, abandoned.

[52] U.S. Cl. ...................252/316, 117/100 A, 117/100 B, 166/244 C, 206/84, 252/8.5 R, 252/8.5 C, 252/8.55 B, 252/8.55 D, 252/8.55 E, 252/392, 264/4, 424/37
[51] Int. Cl. ...................B44d 1/02, B01j 13/02, C23f 11/14
[58] Field of Search ............252/316, 392, 8.5, 8.5 C, 8.55 B, 252/8.55 D, 8.55 E; 166/244 C; 206/84; 117/100 A; 264/4

[56] References Cited

UNITED STATES PATENTS

| 2,460,259 | 1/1949 | Kahler | 252/8.55 E X |
| 2,800,457 | 7/1957 | Green et al. | 252/316 |
| 2,914,557 | 11/1959 | Oxford | 252/392 X |
| 3,069,370 | 12/1962 | Jensen et al. | 252/316 X |
| 3,270,100 | 8/1966 | Jolkovski et al. | 252/316 X |
| 3,328,257 | 6/1967 | Vrancken et al. | 252/316 X |

*Primary Examiner*—Richard D. Lovering
*Attorney*—Carl C. Batz and Alexander and Speckman

[57] ABSTRACT

A process for production of weighted liquid center microcapsules by coacervation of a macro-colloid from an emulsion having minute droplets of a substantially water-immiscible organic solvent containing a chemical treating agent as the dispersed phase of an aqueous solution of macro-colloid as the continuous phase wherein a powdered metal compound is mixed into the aqueous phase prior to encapsulation resulting in weighted microcapsules having a specific gravity of 1.3 to 2.6. The powdered metal compound functions as an auxiliary wetting agent as well as a weighting agent.

16 Claims, 3 Drawing Figures

PATENTED JUL 11 1972

3,676,363

INVENTOR
Benjamin Mosier

BY
Alexander & Speckman
ATTYS

PRODUCTION OF WEIGHTED MICROCAPSULAR MATERIALS

CROSS-REFERENCE TO RELATED APPLICATIONS

This application is a continuation of copending application Ser. No. 451,285, filed Apr. 27, 1965 and now abandoned, which is a continuation-in-part of Ser. No. 316,763, filed Oct. 16, 1963, now abandoned.

In the production of oil, corrosion of steel subsurface equipment and components has long been recognized as a serious problem of great magnitude. The subsurface metal elements of the system, such as the casing of a producing well, are continuously exposed to a highly corrosive environment where a salt brine is produced with the oil, as is the case in secondary recovery operations and also in original production wells such as those of a marginal production type where the oil has a substantial salt water content. Such brines frequently present the added problem of sulfide corrosion where they contain dissolved hydrogen sulfide.

In an effort to combat subsurface corrosion, a practice has developed of introducing corrosion inhibitors into the casings of oil wells. The present practice requires the interruption of normal oil production, the corrosion inhibitor being introduced at the surface into a recirculating flow of oil or oil-brine, and thereby forming a coating or film on the subsurface metal parts. This practice also requires repeated applications of the inhibitor at frequent intervals. In a single application, it is difficult to assure a complete or perfect coating of all of the subsurface metal parts, and the coating is subject to deterioration during normal oil production, the film being gradually removed from the metal surfaces as the oil or oil-brine mixture flows over them. It is, therefore, necessary to repair the inhibitive film at sufficiently frequent intervals to assure that even those surfaces exposed to the greatest deterioration and loss of the film will be sufficiently protected.

It will be apparent from the foregoing that what has been needed is some means for continuously supplying or metering a corrosion inhibitor into the oil or oil-brine mixture of a production well in such a way that substantially all of the subsurface components are continuously exposed to a film-replenishing concentration of the corrosion inhibitor. It is, therefore, one of the important objects of the present invention to provide a method and composition for solving this problem. It will be understood, however, that the method and microcapsular material of the present invention have other applications where it is desired to continuously introduce a treating agent into a flowing stream where the stream is an aqueous medium or at least contains an aqueous phase.

For example, in secondary oil recovery operations, there is need for an improved means for introducing a bactericide and/or corrosion inhibitor into the flooding waters which are pumped down the injection wells and caused to flow through the oil strata toward the secondary production well. It has been found that bacterial growth in the oil strata during secondary recovery operations can seriously reduce the permeability of the strata, and thereby interfere with the flow of the flooding water. It has therefore become an accepted practice to introduce a bactericidal agent into the flood water before it is pumped down the injection wells. This is accomplished by an intermittent or slug-type injection. Special metering or injecting equipment is required. It is therefore another object of this invention to provide a greatly simplified and improved method for the continuous introduction of a bactericide and/or corrosion inhibitor into the flood water used for secondary oil recovery. More particularly, it is a further object to provide a method and composition which permit these results to be accomplished without requiring any special apparatus or mechanical equipment for introducing or injecting the bactericide and/or corrosion inhibitor. Further objects, applications and advantages will be indicated in the following detailed specification.

Figure 1:
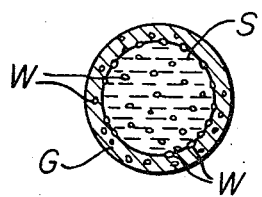
Figure 3:
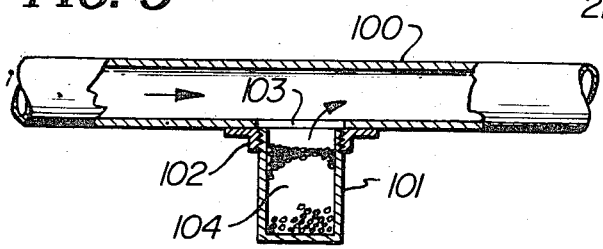

Certain aspects of the present invention may be better understood by reference to the accompanying drawings, wherein:

FIG. 1 is a greatly magnified, idealized showing of a microcapsular material embodying the principles of the present invention;

FIG. 2 is a diagrammatic view, illustrating the method of employing the microcapsular material of this invention for controlling corrosion in oil well production, the drawing illustrating the subsurface casing and associated components of a typical producing oil well; and FIG. 3 is a diagrammatic view illustrating a simple arrangement whereby the microcapsular material of this invention can be used to introduce a bactericide and/or corrosion inhibitor into the flooding water for secondary oil recovery, the view illustrating a section of a pipe through which the flood water is being pumped prior to introduction into an injection well.

In the copending applications of Benjamin Mosier and Charles E. Tippett, Ser. No. 697,306, entitled "Process for Encapsulating Basic Nitrogen Compounds with Acid Precursor Gelatin" and Ser No. 697,307, now U.S. Pat. No. 3,574,132 entitled "Process for Encapsulating Basic Nitrogen Compounds with Alkali Precursor Gelatin" both filed Jan. 12, 1968, as Continuation-In-Parts of parent application Ser. No. 433,501, filed Feb. 17, 1965, and now abandoned, entitled "Process of Encapsulating Nitrogen Compounds and Microcapsular Material Produced Thereby", there is described a process for manufacturing microcapsular materials which may be adapted for use in the present invention. According to the process there described, a nitrogen compound, such as an aliphatic amine, is encapsulated by forming a mixture of an organic solvent phase having the nitrogen compound dispersed therein and an aqueous gelatin phase at an alkaline pH, reducing the pH of the mixture to a pH below 5.5 at which a substantial portion of the mixture is an emulsion with the aqueous gelatin phase being the continuous phase, and recovering therefrom a microcapsular material consisting essentially of minute droplets of the solvent dispersion enclosed by an outer skin of gelatin. In one preferred embodiment, the aqueous solution has an initial pH of 8.5 to 10.5, and the pH of the emulsified mixture is reduced to a pH below 5.0. To improve the coating of the droplets, the microcapsular material, prior to removal from the aqueous gelatin solution, may be carried through a further pH change wherein the pH of the emulsion mixture is returned to a pH above 5.5, or preferably a pH on the alkaline side, such as a pH within the range from 7.5 to 11. Either alkali-precursor gelatin or acid-precursor gelatin may be used for this encapsulation procedure. Since the details of this specific encapsulation process do not form a part of the present invention, and since the process is more fully disclosed in the cited copending application, it is not believed necessary to repeat all of this disclosure herein.

Speaking more generally, the microcapsular material of this invention may be prepared by any procedure or variation thereof wherein a treating agent is dispersed in a water-immiscible solvent, and then emulsified with an aqueous solution containing one or more macro-colloids which are capable of undergoing simple or convex coacervation. In the process of coacervation, one or more of the macro colloids deposits itself around the dispersed droplets of the water-immiscible solvent and treating agent. The droplets are thereby completely encapsulated and sealed. Various techniques for accomplishing such microencapsulation by coacervation are well known in the art, and these techniques as such do not form a part of the present invention, but only provide the technical means for preparing a particular novel microcapsular material which can be used in practicing the method of the present invention. For example, there may be employed the encapsulation technique described in Green et al. Pat. No. 2,800,457 (now Re.24,899), or in Green Pat. No. 2,800.458. These procedures all utilize a complex hydrophilic colloid material, such as gelatin, to encapsulate water-immiscible droplets within an oil-in-water type emulsion. Besides gelatin, other hydrophilic colloids can be used, including albumen, alginates such as sodium alginate, casein, agaragar, starch, pectins, carboxy-methyl cellulose, Irish moss and gum arabic.

While prior techniques of encapsulation can be used in manufacturing the microcapsular material useful in practicing the present invention, it must be understood that the microcapsular material of the present invention must meet certain requirements and conditions which heretofore have not been considered as important for such microcapsules. In prior applications, the chemical agent contained within the microcapsules is released by the application of pressure and/or heat to the capsules. The fact that the outer skin of the capsules is formed of a hydrophilic or water-soluble colloid has not been recognized as having any great importance. Moreover, such microcapsular materials as heretofore have been prepared are of relatively low specific gravity, being either lighter than water, or at least not appreciably denser than water. Such low specific gravity capsules would not be suitable for the purpose of the present invention, which requires that the microcapsular material be substantially heavier, or at least have a substantially higher average specific gravity, than the aqueous-phase providing flowing stream to which the capsular material is subjected. As will subsequently be described in greater detail, the method of the present invention utilizes a deposit of the microcapsular material which is contacted with the aqueous medium, such as a flowing stream of water (or a stream containing an aqueous phase) as a means of introducing the treating agent into the water. For example, a portion of the deposited material in contact with the stream, such as the upper layer of the deposit, is subjected to the dissolving action of the aqueous phase, which gradually dissolves the water-soluble coating material, and thereby permits the treating agent contained within the capsules to enter the flowing stream. However, in order to prevent this process from proceeding too rapidly and to maintain the deposited supply of the microcapsular material, it is desirable that the material have a specific gravity substantially greater than that of the water or the flowing stream. Speaking generally, the microcapsular material of this invention will preferably have a specific gravity of from 1.3 to 2.6. Where the flowing stream is water, a brine, or a mixture of oil and brine, it will usually be preferable for the microcapsular material to have a specific gravity of about 1.5 to 1.8. A deposit of the microcapsular material can also be used in an essentially static system, such as a tank containing water or at least an aqueous phase or medium.

Since the required ingredients of the microcapsular material, such as the hydrophilic colloid, the water-immiscible solvent, and the treating agent, will not normally be capable of being combined to produce a microcapsular material having the desired, relatively high specific gravity, the invention contemplates the incorporation of a weighting agent as an essential constituent of the microcapsules. Since the particles of capsular material are in the micron size range (e.g., 30–40 micron diameter), the weighting agent should be in the form of a very finely divided material, such as a finely ground powder. For example, powders having an average size of less than 10 microns may be used, while powders having an average particle diameter of 1–3 microns are particularly desirable.

While various finely divided materials can be used as weighting agents, it is preferred to employ a metal compound, such as a metal salt, oxide, or hydroxide. Polyvalent metal compounds are particularly suitable because of the high specific gravity of such compounds and their generally low solubility in water. For example, such polyvalent metal compounds include barium sulfate, lead oxide, zinc oxide, lead chloride, iron sulfide, etc. However, other metal compounds can be used such as potassium bromate, sodium silicofluoride, potassium periodate, potassium stannibromide, etc. The metal compound should have a specific gravity of at least 2.5 and preferably about 3.0. Metal compounds having specific gravities within the range from 4.5–10.0 are particularly advantageous. Lead oxide, lead chloride, or a mixture of lead oxide and lead chloride have been found to give outstanding results. It will be understood, however, that many other metal and polymetal compounds can be employed. In general, metal compounds of relatively low solubility in water can be used most efficiently, since the amount lost to the aqueous phase by dissolving therein will be small. For example, metal compounds having a maximum solubility in water of less than 1 percent at 25°C, are suitable, while a solubility below 0.5 percent is usually preferred. However, metal compounds having greater solubilities can be used.

The weighting compound in the form of a finely divided powder can be very easily incorporated in the capsular material. One convenient procedure is to mix the finely divided powder with the oil-in-water type emulsion prior to the formation of the protective colloid films around the dispersed droplets. The finely divided powder tends to function as an auxiliary wetting agent, and will therefore tend to collect at the interfaces between the dispersed droplets and the continuous aqueous phase. Some of the particles may also enter the droplets themselves, and, some of the weighting compound will also be in the aqueous phase either in solution or suspension. When the films of the macro colloid are formed around the droplets, the weighting material at the interface is trapped and held in the microcapsules. If it is desired to further disperse the weighting agent within the droplets themselves, this can be accomplished by causing the emulsion to undergo one or more phase changes from an oil-in-water emulsion to a water-and-oil emulsion or vice versa. Usually, such phase changes will occur at a pH of around the isoelectric pH or pH range of the gelatin where gelatin is employed as the macro colloid. Where such a phase inversion is carried out in the presence of the finely divided weighting agent, the weighting agent will tend to disperse itself more completely in the water-immiscible solvent. Such a pH adjustment procedure for encapsulation is described more fully in the above-cited copending applications of Mosier and Tippett. For the reasons indicated, this particular procedure has been found to be desirable to incorporate a maximum amount of the weighting agent in the encapsulated material. However, any coacervation encapsulation carried out in the presence of a finely divided metal compound of the character described will result in the incorporation of a considerable percentage of the compound in the capsules, and thereby increase the weight of the compound.

The microcapsular material may contain a smaller or larger amount of the weighting agent, depending upon the desired final weight of the capsules. For example, the capsules may contain from 5–75 percent by weight of the weighting agent. However, for most purposes the microcapsular material will usually contain at least 10 percent, but not over 50 percent, of the weighting agent. Lesser amounts of the weighting agent usually do not contribute sufficiently to the desired increase in amount, while larger quantities may make it difficult to incorporate the desired amount of the water-immiscible solvent and treating agent contained therein.

By following the procedure just described, microcapsular material having a specific gravity within the range from 1.3–2.0 can readily be produced. For oil field applications, where saline brines are encountered having specific gravities as high as 1.2–1.3, it is preferred that the microcapsular material have a specific gravity above 1.5, such as a specific gravity within the range from 1.5–1.8. Where it is desired to obtain this result, an excess of the weighting agent may be incorporated in the emulsion. The quantity which will be incorporated in the microcapsular material is limited by the extent of the interfacial area between the droplets and the aqueous phase. Consequently, the excess of the weighting agent which is not embedded in the droplets or dissolved in the aqueous solution will remain suspended in the supernatant aqueous solution and can be separated therefrom. For example, from 0.5 to 1.5 parts of the weighting agent per part by weight of the dispersed phase (water-immiscible solvent and treating agent) can be used. Where the weighting agent is alkaline in nature, such as lead oxide, the emulsion may be carried through a pH change to the acid side without interfering with the desired function of the weighting agent. For example, if hydrochloric acid is used to adjust the pH to the acid side, part of the lead oxide may be converted to lead chloride, and the capsules will therefore contain a mixture of lead oxide and lead chloride as the weighting agent. For certain applications, this may even be particularly advantageous, since lead chloride is more soluble in water than lead oxide. The weighting agent will therefore tend to dissolve and disperse as the capsules are dissolved, and will not accumulate unduly or form a barrier layer which would retard the solubilization of the microcapsular material. It will be understood, however, that these considerations depend upon the specific application to be made of the microcapsular material. Usually, however, it will not be desirable to employ a completely insoluble weighting agent, such as a metal powder like powdered iron or lead.

It will be appreciated that a wide variety of treating agents may be incorporated in the weighted microcapsular material of this invention. All that is required is that the treating agent be dispersible in the water-immiscible solvent. The treating agent may be either suspended or dissolved in the solvent, and may be substantially water-insoluble as well as water-soluble. Where the flowing stream is an aqueous medium, the treating agent is preferably water-soluble. However, the flowing stream or other aqueous medium may also contain another phase, such as an oil phase, and the treating agent can be soluble in the other phase. For example, in the treatment of a flowing mixture of brine and oil for the purpose of inhibiting corrosion in the oil well casing, it will usually be preferable to have the treating agent oil-soluble rather than water-soluble. In such an application, the aqueous phase will dissolve the exterior coating of the capsule, and the treating agent will thereafter disperse or dissolve in the oil phase together with the water-immiscible solvent carrier.

The carrier solvent is preferably an inert organic solvent which does not attack the macro-colloid or cause it to deteriorate, and the treating agent should be stable in the solvent. While a wide variety of organic solvents can be used, the solvent should be at least partially immiscible with the aqueous phase under the conditions of the process, thereby making it possible to form a dispersed organic solvent phase containing the nitrogen compound. For most purposes, an oil solvent will be particularly desirable, such as a hydrocarbon oil. For example, a hydrocarbon solvent such as kerosene is particularly suitable. Other hydrocarbon solvents like diesel fuel may be used. Other aliphatic or aromatic solvents, including mixtures thereof, will be useful in certain applications as described more fully in the cited copending applications Ser. Nos. 697,306 and 697,307, said Ser. No. 697,307 having matured into U.S. Pat. No. 3,574,132. It will be understood that the selection of the particular solvent is not critical, although an oil solvent is particularly desirable where the treating agent is oil-soluble, or where it is desired to introduce the treating agent into a stream or other aqueous medium containing an oil phase.

As previously indicated, this invention has particular application to the encapsulation and use of nitrogen compounds which have corrosion inhibition properties and/or bactericidal properties. More particularly, the nitrogen compound should have corrosion inhibition properties when applied to a metal surface, such as a ferrous metal surface. Also, when bactericidal properties are desired, the nitrogen compound should usually be water-soluble and should manifest the bactericidal properties in aqueous solution. The general class of nitrogen compounds are those which contain at least one nitrogen atom, and at least one aliphatic chain of from 12 to 22 carbon atoms, such as the aliphatic chains derived from natural fats and oils. For example, the aliphatic chain will preferably contain from 12 to 18 carbon atoms, when it is produced from most common animal fats or vegetable oils. The aliphatic amine, such as the primary amines, or aliphatic diamines, are particularly preferred, although the nitrogen of the compound can be in the form of a primary amine, secondary amine, tertiary amine, or quaternary. Hydroxamic acids, such as oleyl hydroxamic acid, can also be utilized as corrosion inhibitors. One particularly suitable corrosion inhibitor for oil well application is tallow trimethylene diamine dinapthenate. A specific example of a bactericide is cocoamine acetate, or coco diamine. Other specific examples of corrosion inhibitors and/or bactericides are cocodiamine adipate, trimethylalkyl ammonium chloride, or dimethyl dialkyl ammonium chloride, where the alkyl group is derived from a natural fat source, such as tallow, coconut oil, or cottonseed oil. Cyclic nitrogen compounds can also be used, such as imidazoline compounds, particularly quaternized imidazolines.

This invention is further illustrated by the attached drawing, the figures of which will now be described. In FIG. 1, there is shown a greatly magnified diagrammatic view of a single capsule of a microcapsular material such as would be used in practicing the present invention. This capsule includes a central portion S containing the mixture of the water-immiscible solvent and the treating agent. The capsule includes an outer layer of skin G which is formed of the water-soluble macro-colloid. The capsule also contains particles of the weighting agent W. It will be understood that the location and distribution of these particles W are not known with certainty, but it is believed that the particles tend to predominate at the interface between the core S and the surface layer G, as indicated in the diagrammatic showing of FIG. 1.

In FIG. 2, there is illustrated an application of the method of this invention to a pumping well where the microcapsular material is employed to supply a corrosion inhibitor to the oil-brine mixture flowing into the bottom of an oil well casing in a producing well. It will be understood that the method can be applied to all types of well production, including gas-lift wells, flowing wells, etc. The diagram shown is that of a pumping well having a casing 10 with a bottom liner 11 which is cemented in place by cement 12. There is also included a tubing 13 within which the sucker rod reciprocates by means of a suitable pump (not shown). The casing 10 extends up through a surface casing 15 to provide an outlet 16 for the oil-brine mixture being produced. The annulus 17 between the tube 13 and the casing 10 communicates with a port 17a, which may be used for the discharge of gas and/or the introduction of materials such as the microcapsular material of the present invention. Other fluids may also be removed or introduced through port 17a.

The liner 11 extends downwardly into the oil sand 18 and communicates therewith through a series of perforations 19. The bottom end of the liner 11 is sealed with a cement plug 20. As will be noted, the extreme bottom portion of liner 12 is imperforate, as indicated at 12a, thereby providing a sump below the lowest ring of the perforations 19.

In practicing the method of the present invention, the microcapsular material can be introduced into the annulus 17 through the port 17a. It will be understood that normal oil production will be interrupted for the introduction of microcapsular material, although casing 10 and liner 11 will be full of the oil-brine mixture. The microcapsular material, being substantially heavier than the oil-brine mixture or either of the phases thereof, will fall downwardly to the bottom of the well, and will collect within the sump provided by the lower end of liner 11, as indicated at 21. When production is resumed, the oil-brine mixture will flow over the top of the deposited material 21, and will gradually dissolve the material layer by layer from the top downwardly. This will result in the corrosion inhibitor being continuously introduced into the flowing stream. The corrosion inhibitor will usually dissolve in the oil phase and will be carried to all of the surfaces of the steel casing and other subsurface components. It has been found that a sufficient supply of the corrosion inhibitor can be introduced in this way to maintain the desired corrosion inhibitor level in the produced oil for from 60 to 90 days.

In FIG. 3, there is shown a simple device for introducing a bactericidal treating agent into a flowing stream of water or brine, such as might be employed for the water injection in secondary oil recovery. The injection water is being pumped from a source of supply through a pipe 100, as indicated by the arrow. On the lower side of the pipe, there is attached a container 101, which, in the illustration given, is threadedly connected to a collar 102. The upper end of container 101 is open to provide an outlet 103 which communicates directly with the flowing stream. A deposit of the microcapsular material as indicated at 104 can then be placed in the container 101 and gradually solubilized by the flowing stream. Where the microcapsular material contains a bactericidal treating agent, effective bactericidal levels can be maintained in the stream for prolonged periods of time. The bactericidal agent will then be carried by the water down the injection wells and into the oil sands to prevent undue bacteria growth and plugging of the sands.

This invention is further illustrated by the following specific examples.

EXAMPLE 1

4.0 grams of acid-precursor gelatin were dissolved in 100 milliliters of water. 4.0 grams of okra-gum were dissolved in 100 milliliters of water. These two solutions were mixed together and placed in a Waring Blender along with 50 grams of $BaSO_4$. These materials were thoroughly mixed and at the same time 16 milliliters of a wetting agent (Triton X-305) were added. After the mixing was complete, the contents of the Blender were put in a beaker and placed in an oil bath at a temperature of 50°C. As the contents of the beaker were gently stirred, a solution of 40 grams of tallow trimethylene diamine dinaphthenate (75 percent active, 25 percent kerosene) in 50 milliliters of additional kerosene were slowly added. The pH of the emulsion was adjusted from the initial pH of 8.0 to 6.0 with 50 percent active acetic acid. Some capsules formed at a pH of 8.0, and the encapsulation was complete at a pH of 6.0.

EXAMPLE 2

0.75 grams of Kelgin (sodium alginate) were dissolved in 150 milliliters of water. This Kelgin solution, along with 75 grams of $BaSO_4$, was thoroughly mixed in a Waring Blender. During the mixing period, 25 milliliters of an emulsifying agent (Igepal CO-880) were added. After these materials had been thoroughly blended, they were put in a beaker and placed in an oil bath at a temperature of 50°C. As the contents of the beaker were gently stirred, a solution of 200 grams of tallow trimethylene diamine dinaphthenate (75 percent active, 25 percent kerosene) in 50 ml. of additional kerosene was added. No pH change was made. The encapsulation was very good.

EXAMPLE 3

1.0 gram of Kelcoloid LV (propylene glycol ester of alginic acid) was dissolved in 200 milliliters of water. This Kelcoloid solution and 75 grams of $BaSO_4$ are thoroughly mixed in a Waring Blender. During the mixing period 25 milliliters of a wetting agent (Igepal CO-880) were added. After the materials were thoroughly blended, they were put in a beaker and the beaker was placed in an oil bath at 50°C. As the contents of the beaker were gently stirred, a solution of 200 grams of tallow trimethylene diamine dinaphthenate (75 percent active, 25 percent kerosene) in 25 milliliters of additional kerosene were added. Next, 5 milliliters of a 0.1M solution of calcium chloride were added. No pH change was made, and the encapsulation was good.

EXAMPLE 4

20 grams of hide glue were dissolved in 75 milliliters of water. This glue solution, plus 75 grams of $BaSO_4$, were thoroughly mixed in a Waring Blender. During this mixing period, 12.5 milliliters of a wetting agent (Igepal CO-880) were added. After the materials were thoroughly blended, they were put in a beaker and the beaker placed in an oil bath at 50°C. As the contents of the beaker were gently stirred, a solution of 100 grams of tallow trimethylene diamine dinapthenate (75 percent active, 25 percent kerosene) in 25 milliliters of additional kerosene was added. Like microcapsules were formed.

EXAMPLE 5

4.0 grams of alkali-precursor gelatin (225-B) were dissolved in 150 milliliters of water. This gelatin solution and 75 grams of $BaSO_4$ were thoroughly mixed in a Waring Blender. During this mixing period, 12.5 milliliters of a wetting agent (Igepal CO-880) were added. After the materials were thoroughly mixed, they were put in a beaker and the beaker was placed in an oil bath at 50°C. As the contents of the beaker were gently stirred, a solution of 100 grams of tallow trimethylene diamine dinapthenate (75 percent active, 25 percent kerosene) in 25 milliliters of additional kerosene was added slowly. The pH was adjusted from the initial pH of 8.0 to pH 10.0, and 60 milliliters of formaldehyde solution (37 percent active) were added to the emulsion. With the addition of the formaldehyde solution, the pH dropped to 8.4, which was the final pH. A very good emulsion was formed and encapsulation was good.

EXAMPLE 6

4.0 grams of acid-precursor gelatin (300-bloom) were dissolved in 150 milliliters of water. This gelatin solution and 150 grams of $BaSO_4$ were thoroughly mixed in a Waring Blender. During this mixing period, 25 milliliters of a wetting agent (Igepal CO-880) were added. After the materials were thoroughly mixed, they were put in a beaker and the beaker was placed in an oil bath at 50°C. As the contents in the beaker were stirred, a solution of 200 grams of tallow trimethylene diamine dinapthenate (75 percent active, 25 percent kerosene) in 50 milliliters of additional kerosene was added. A good emulsion was formed, and the treating agent was encapsulated.

EXAMPLE 7

162.5 grams of coco primary amine acetate (Armac C), 50 grams of tallow trimethylene diamine dinapthenate (Duomeen TDS-75, 75 percent active, 25 percent kerosene), 150 grams powdered lead oxide, and 37.5 grams of kerosene were mixed together at 40°C. 10 grams of acid-precursor gelatin (Gelatin A, 175 Bloom) were dissolved in 150 milliliters of water and added to this mixture. With the temperature at 40°C., the pH of the mixture was slowly adjusted with continuous mixing from the initial pH of 9.5 to 4.0 with 18 percent hydrochloric acid. The time required for the addition of the acid was about 6 to 8 hours. The encapsulation at the pH 4.0 was acceptable, although some undispersed oil phase was present as water-in-oil emulsion.

The encapsulated material was separated out in a 20 percent solution of sodium sulfate at 25°C. The material was stirred in the sodium sulfate solution for 30 minutes and filtered by suction filtration.

After the sodium sulfate solution had been filtered off, the material was stirred into 300 milliliters of water in which 6.0 grams of alkali-precursor gelatin (Gelatin B, 200-bloom) had been dissolved.

The material was separated out in a 20 percent solution of sodium sulfate. While the encapsulated material was being stirred in the sodium sulfate solution, the pH was adjusted to 9.8 with 35 percent NaOH solution. The stirring time was 30 minutes.

EXAMPLE 8

A mixture of the ingredients described in Example 2 is prepared following the same procedure, except that the lead oxide is first dispersed in the gelatin prior to the addition of the Armac C and Duomeen TDS-75. This order of addition um chloride, 20 percent tallow trimethylene diamine dinapthenate, and 10 percent kerosene were added. During the mixing period 25 milliliters of Igepal CO-887 (ethoxylated nonyl phenol) were added. The temperature of the mixture was maintained at 40°C. during the following pH changes. The pH of the mixture was slowly adjusted with continuous stirring from the initial pH of 9.5 to pH 3.8 with 18 percent hydrochloric acid. The pH was then adjusted from 3.8 to 9.3 with 35 percent active sodium hydroxide. The encapsulation was very good.

The material was separated out by stirring into a 20 percent solution of sodium sulfate. After a 5-minute stirring period, the material was allowed to settle and the excess sodium sulfate solution was poured off. The remaining material was poured into 150 milliliters of water in which 8 grams of acid-precursor gelatin (Gelatin A, 175-bloom) had been dissolved.

The material was again separated out in a 20 percent solution of sodium sulfate. As the material was being stirred in the sodium sulfate solution, the pH of the solution was adjusted to 9.8 with 35 percent active sodium hydroxide. The pH change of the sodium sulfate solution caused the material to break into more distinct particles and settle from the sodium sulfate faster and more completely.

EXAMPLE 12

4 grams of alkali-precursor gelatin (Gelatin B, 225-bloom) were dissolved in 150 milliliters of water and 75 grams of lead oxide stirred into the gelatin solution. 85 grams of a solution made up of 70 percent oleyl hydroxamic acid, 20 percent tallow trimethylene diamine dinapthenate, and 10 percent kerosene were thoroughly mixed with the gelatin solution-lead oxide combination. During this mixing period, 25 ml. of Igepal CO-887 (ethoxylated nonyl phenol) were added. The temperature of this mixture was maintained at 40°C. during the following pH changes, and stirring was continued. The pH of the mixture was adjusted from the initial pH of 9.3 to 3.8 with 18% hydrochloric acid. At this point a stable oil-in-water emulsion was obtained. The pH was then adjusted from 3.8 to 8.2 with 35 percent active sodium hydroxide. The encapsulation was very good.

The material was separated out by stirring it in a 20 percent solution of sodium sulfate. The stirring was continued for 10 minutes, during which time the pH of the sodium sulfate solution was adjusted to 9.5. The solids were filtered out by suction filtration.

The solid material was dispersed into 150 ml. of water in which 6 grams of acid-precursor gelatin (Gelatin A, 175-bloom) had been dissolved. The material was again separated out in a 20 percent solution of sodium sulfate and the pH of the solution adjusted to 9.5. The stirring time was 10 minutes.

EXAMPLE 13

4 grams of alkali-precursor gelatin (Gelatin B, 225-bloom) were dissolved in 150 milliliters of water and 75 grams of lead oxide were stirred into the gelatin solution. 85 grams of a solution made up of 70 percent tallow primary amine, 20 percent tallow trimethylene diamine dinapthenate, and 10 percent kerosene were added and thoroughly mixed with the gelatin solution-lead oxide mixture. During this mixing period, 25 milliliters Igepal CO-887 (ethoxylated nonyl phenol) were added. The temperature of this mixture was maintained at 40°C. during the following pH changes. The pH of the mixture was adjusted from the initial pH of 9.3 to pH 5.2 with 18 percent hydrochloric acid. A stable oil-in-water emulsion was present at this point. The pH was then adjusted from 5.2 to 8.2 with 35 percent active sodium hydroxide. The encapsulation was very good.

The material was separated out by stirring into a 20 percent solution of sodium sulfate. The stirring was continued for 10 minutes, during which time the pH of the sodium sulfate solution was adjusted to 8.5. The material was filtered by suction filtration.

The solid material was dispersed in 150 milliliters of water in which 6 grams of acid-precursor gelatin (Gelatin A, 175-bloom) had been dissolved. The material was again separated out in a 20 percent solution of sodium sulfate and the pH of the sodium sulfate solution adjusted to 8.5. Stirring time in the sodium sulfate solution was 10 minutes.

EXAMPLE 14

4.74 grams of acid-precursor gelatin (Gelatin A, 175-bloom) is dissolved in 76.5 ml. of water. 75 gms. of lead oxide is thoroughly mixed with the aqueous gelatin. To the resulting dispersion is added 81 gms. of Armac C (coco primary amine acetate), 25 gms. of Duomeen TDS-75 (75 percent active, 25 percent kerosene), and 25 cc. of kerosene. Duomeen TDS-75 is tallow trimethylene diamine dinapthenate. All of these ingredients are thoroughly mixed together, and the mixing is continued throughout the balance of the process.

Starting with an initial pH of about 9.3, the pH is reduced to about 2.5 by adding 150 ml. of 18 percent hydrochloric acid. The acid is added slowly over a period of about 6 hours.

At pH 2.5, the stable oil-in-water emulsion is obtained, with the dispersed oil droplets encapsulated by the gelatin. The pH is then readjusted with 20 ml. of 35 percent sodium hydroxide to a final pH of about 6.0. At this pH, the emulsion is stable, and contains the encapsulated product. The product may then be separated and recovered as described in either Example 10 or Example 11.

EXAMPLE 15

Three grams of alkali-precursor gelatin (Gelatin B, 225-bloom) were dissolved in 150 milliliters of water. 75 gms. of PbO powder were added to the gelatin solution. To the gelatin-PbO mixture was added a mixture of 68.0 grams of coco trimethylene diamine, 12.75 grams of tallow trimethylene diamine dinapthenate (75 percent active, 25 percent kerosene), and 4.25 grams of kerosene.

The pH of the mixture was slowly adjusted with continued stirring from the initial pH of 9.8 to pH 4.5 with 18 percent hydrochloric acid. 5 milliliters of formaldehyde solution (37 percent) was added to harden the microcapsular material and the pH adjusted to 9.8 with 35 percent NaOH before recovery of the encapsulated material. All of the above operations were carried out at 40°C.

The microcapsular material was separated out in a solution made up of 1.5 percent potassium ferrocyanide and 1.0 percent ammonium sulfate. Stirring time was 2 minutes.

EXAMPLE 16

Five grams of alkali-precursor gelatin (Gelatin B) were dissolved in 150 ml. of water and 75 grams of lead oxide were stirred into the gelatin solution. Thereafter, 85 grams of coco-trimethylene diamine (75 percent active, 25 percent isopropyl alcohol), and 5 grams of Igepal CO-887 (ethoxylated nonyl phenol) were added and thoroughly mixed. With continual stirring, the pH was adjusted to 4.0 with 27 percent hydrochloric acid. Thereafter the pH was adjusted with 35 percent sodium hydroxide to a pH within the range from 9 to 10. At this point, the encapsulation was complete. The slurry was dispersed into 20 percent aqueous sodium sulfate for separation of the encapsulated material.

EXAMPLE 17

6 grams of alkali-precursor gelatin (Gelatin B) were dissolved in 150 ml. of water, and 75 grams of lead oxide powder were stirred into the gelatin solution. Thereafter, 100 grams of Arquad T-2C were added. Arquad T-2C consists of a mixture of tallow trimethyl quaternary ammonium chloride and dicoco dimethyl quaternary ammonium chloride, 50 percent active in isopropyl alcohol. Thereafter, with continual stirring, the pH was adjusted with 27 percent hydrochloric acid to approximately pH 3. Next the pH was readjusted with 30 percent sodium hydroxide to a pH in the range of 9 to 10. The encapsulation was then complete. The encapsulated material was separated, as previously described, with 20 percent sodium sulfate.

EXAMPLE 18

5 grams of alkali-precursor gelatin (Gelatin B) were dissolved in 150 ml. of water, and 75 grams of powdered lead oxide were stirred into the gelatin solution. Then 85 grams of Arquad-S was added. Arquad-S is soya trimethyl quaternary ammonium chloride, 50 percent active in isopropyl alcohol. Twenty grams of Igepal CO-887 (ethoxylated nonyl phenol) were also added. With continual stirring, the pH was gradually adjusted to approximately 4 by the addition of 27 percent hydrochloric acid. Following this adjustment, the pH was readjusted with sodium hydroxide to approximately 9 to 10. At this point, the encapsulation was complete, and the encapsulated material was separated, as previously described, by using 20 percent sodium sulfate.

Microcapsular treating agents produced by the method of this invention are deemed applicable for the continuous introduction of an emulsifier or solvent carrier into the oil phase, as may be desired where the oil contains paraffin at or near solidification temperatures, and thereby, tends to promote the complete removal of the paraffin and to prevent the deposit of paraffin solids within the well.

I claim:

1. In a process for production of weighted liquid center microcapsules containing a chemical treating agent by simple or complex coacervation from an emulsion having minute droplets of a substantially water-immiscible organic solvent containing said treating agent as the dispersed phase of an aqueous solution of coacervate forming macro-colloid as the continuous phase by forming coacervate layers around said liquid droplets and thereby encapsulating said droplets containing said treating agent, the improvement comprising; mixing from 5 to 75 weight percent based upon the total capsular weight, of powdered metal compound capable of functioning as an auxiliary wetting agent and having maximum solubility in water of less than 1 percent at 25°C., an average particle diameter of less than 10 microns and selected from the class consisting of metal salts, oxides, and hydroxides having a specific gravity of at least 2.5, into said continuous aqueous phase of said emulsion prior to said encapsulation so that when said weighted microcapsules are formed by coacervation said metal powder is predominantly at the interface between said dispersed droplets and the continuous phase, said microcapsules having a specific gravity of 1.3 to 2.6.

2. The process of claim 1 wherein said powdered metal compound has an average particle diameter from about 1 to 3 microns.

3. The process of claim 1 wherein said powdered metal compound has a specific gravity of from 4.5 to 10.0 and is formed from a polyvalent metal.

4. The process of claim 1 wherein said microcapsules contain from 10 to 50 weight percent of said powdered metal compound.

5. The process of claim 1 wherein the said organic solvent is a hydrocarbon oil solvent.

6. The process of claim 1 wherein said powdered metal compound is selected from the class consisting of barium sulfate, lead oxide, lead chloride, and mixtures of lead oxide and lead chloride.

7. The process of claim 1 wherein said powdered metal compound is metal oxide.

8. The process of claim 1 wherein said powdered metal compound is metal hydroxide.

9. The process of claim 1 wherein said treating agent is an organic nitrogen compound selected from the class consisting of amines and quaternaries.

10. A process for production of weighted liquid center microcapsules containing a chemical treating agent comprising forming a mixture of a first liquid phase comprising an aqueous solution of an alkali-precursor gelatin soluble in water at both alkaline and acid pH's, said aqueous gelatin phase being initially at an alkaline pH; a second liquid phase comprising a substantially water-immiscible organic solvent having a chemical treating agent dispersed therein; and 5 to 75 weight percent of powdered metal compound capable of functioning as an auxiliary wetting agent and having an average particle diameter of less than 10 microns and selected from the class consisting of metal salts, oxides, and hydroxides and having a specific gravity of at least 2.5; then reducing the pH of said aqueous gelatin phase to an acid pH of at least 4.5 and intermixing said phases to disperse and emulsify said organic solvent phase in the aqueous phase thereby providing minute droplets of said treating agent in organic solvent surrounded by said aqueous solution of said alkali-precursor gelatin, said alkali precursor gelatin forming a coating on said droplets with said powdered metal compound predominantly at the interfaces between said droplets and the continuous phase and producing encapsulation of said droplets; and recovering the weighted liquid center microcapsules.

11. The process of claim 10 wherein the pH of said gelatin is reduced to at least 3.8.

12. The process of claim 11 wherein the pH of said gelatin phase is raised above 5.5 prior to recovering the weighted liquid center microcapsules.

13. A process for production of weighted liquid center microcapsules containing a chemical treating agent comprising forming a mixture of a first liquid phase comprising an aqueous solution of an acid precursor gelatin soluble in water, said aqueous gelatin phase being initially at an alkaline pH; a second liquid phase comprising a substantially water-immiscible organic solvent having a chemical treating agent dispersed therein; and 5 to 75 weight percent of powdered metal compound capable of functioning as an auxiliary wetting agent and having an average particle diameter of less than 10 microns and selected from the class consisting of metal salts, oxides, and hydroxides and having a specific gravity of at least 2.5; then reducing the pH of said aqueous gelatin phase to an acid pH of at least 4.0 and inter-mixing said phases to disperse and emulsify said organic solvent phase in the aqueous phase thereby providing minute droplets of said treating agent in organic solvent surrounded by said aqueous solution of said acid-precursor gelatin forming a coating on said droplets with said powdered metal compound predominantly at the interfaces between said droplets and the continuous phase and producing encapsulation of said droplets; and recovering the weighted liquid center microcapsules.

14. The process of claim 13 wherein the pH of said gelatin phase is reduced to at least 3.0.

15. A process for production of weighted liquid center microcapsules containing a chemical treating agent comprising forming a mixture of a first liquid phase comprising an aqueous solution of an alkali-precursor gelatin soluble in water at both alkaline and acid pH's, said aqueous gelatin phase being initially at an alkaline pH; a second liquid phase comprising a substantially water-immiscible organic solvent having a chemical treating agent dispersed therein; and 5 to 75 weight percent of powdered metal compound having an average particle diameter of less than 10 microns and selected from the class consisting of barium sulfate, lead oxide, zinc oxide, lead chloride, iron sulfide, potassium bromate, sodium silicofluoride, potassium periodate, potassium stannibromide and mixtures of lead oxide and lead chloride and having a specific gravity of at least 2.5; then reducing the pH of said aqueous gelatin phase to an acid pH of at least 4.5 and intermixing said phases to disperse and emulsify said organic solvent phase in the aqueous phase thereby providing minute droplets of said treating agent in organic solvent surrounded by said aqueous solution of said alkali-precursor gelatin, said alkali precursor gelatin forming a coating on said droplets with said powdered metal compound predominantly at the interfaces between said droplets and the continuous phase and producing encapsulation of said droplets; and recovering the weighted liquid center microcapsules.

16. A process for production of weighted liquid center microcapsules containing a chemical treating agent comprising forming a mixture of a first liquid phase comprising an aqueous solution of an acid-precursor gelatin soluble in water, said aqueous gelatin phase being initially at an alkaline pH; a second liquid phase comprising a substantially water-immiscible organic solvent having a chemical treating agent dispersed therein; and 5 to 75 weight percent of powdered metal compound having an average particle diameter of less than 10 microns and selected from the class consisting of barium sulfate, lead oxide, zinc oxide, lead chloride, iron sulfide, potassium bromate, sodium silicofluoride, potassium periodate, potassium stannibromide and mixtures of lead oxide and lead chloride and having a specific gravity of at least 2.5; then reducing the pH of said aqueous gelatin phase to an acid pH of at least 4.0 and intermixing said phases to disperse and emulsify said organic solvent phase in the aqueous phase thereby providing minute droplets of said treating agent in organic solvent surrounded by said aqueous solution of said acid precursor gelatin forming a coating on said droplets with said powdered metal compound predominantly at the interfaces between said droplets and the continuous phase and producing encapsulation of said droplets; and recovering the weighted liquid center microcapsules.

* * * * *